(12) United States Patent
Fan et al.

(10) Patent No.: US 11,557,895 B2
(45) Date of Patent: Jan. 17, 2023

(54) POWER CLAMP

(71) Applicant: Taiwan Semiconductor Manufacturing Company, Ltd., Hsinchu (TW)

(72) Inventors: Ken-Hao Fan, Hsinchu (TW); Yu-Ti Su, Tainan (TW); Tzu-Cheng Kao, Hsinchu (TW); Ming-Fu Tsai, Hsinchu (TW); Chia-Lin Hsu, Hsinchu (TW)

(73) Assignee: Taiwan Semiconductor Manufacturing Company, Ltd, Hsinchu (TW)

( * ) Notice: Subject to any disclaimer, the term of this patent is extended or adjusted under 35 U.S.C. 154(b) by 0 days.

(21) Appl. No.: 17/388,567

(22) Filed: Jul. 29, 2021

(65) Prior Publication Data

US 2022/0352709 A1 Nov. 3, 2022

Related U.S. Application Data

(60) Provisional application No. 63/182,695, filed on Apr. 30, 2021.

(51) Int. Cl.
*H02H 9/04* (2006.01)

(52) U.S. Cl.
CPC .................................. *H02H 9/046* (2013.01)

(58) Field of Classification Search
CPC ........................................................ H02H 9/046
USPC ............................................................. 361/56
See application file for complete search history.

(56) References Cited

U.S. PATENT DOCUMENTS

| | | | |
|---|---|---|---|
| 6,912,109 B1 | 6/2005 | Ker et al. | |
| 8,068,319 B1 * | 11/2011 | Chan | H01L 27/0292 361/111 |
| 9,042,064 B2 | 5/2015 | Srivastava et al. | |
| 9,716,381 B2 | 7/2017 | Chen et al. | |
| 10,734,806 B2 | 8/2020 | Zhao et al. | |
| 2003/0043223 A1* | 3/2003 | Delametter | B41J 2/03 347/20 |
| 2013/0099297 A1 | 4/2013 | He et al. | |
| 2014/0286085 A1* | 9/2014 | Miyakawa | G11C 11/1695 365/158 |
| 2015/0062764 A1* | 3/2015 | Wakita | H02H 9/043 361/57 |
| 2016/0241021 A1* | 8/2016 | Wang | H02H 9/046 |

FOREIGN PATENT DOCUMENTS

| | | |
|---|---|---|
| CN | 101710700 A | 5/2010 |
| TW | 201507307 A | 2/2015 |
| TW | I686031 B | 2/2020 |

OTHER PUBLICATIONS

Office Action for counterpart application DE-102021120230.2 dated Nov. 23, 2021.

* cited by examiner

*Primary Examiner* — Dharti H Patel

(74) *Attorney, Agent, or Firm* — Finnegan, Henderson, Farabow, Garrett & Dunner L.L.P

(57) ABSTRACT

An ESD power clamp device includes an ESD detection circuit; a controlling circuit coupled with the ESD detection circuit; a field effect transistor (FET) coupled with the controlling circuit, and an impedance element coupled with the FET. The FET includes a drain terminal coupled with a first supply node; a gate terminal coupled with the controlling circuit; a source terminal coupled with a second supply node via the impedance element; and a bulk terminal coupled with second supply node.

20 Claims, 11 Drawing Sheets

US 11,557,895 B2

POWER CLAMP

REFERENCE TO RELATED APPLICATION

This application claims the benefit of U.S. Provisional Application No. 63/182,695, filed on Apr. 30, 2021, entitled "POWER CLAMP," the entirety of which is incorporated by reference herein.

BACKGROUND

The electrostatic discharge (ESD) power clamp device using big field-effect transistor (bigFET) had demonstrated excellent ESD protection performance. However, current leakage in bigFET limits its protection performance. As integrated circuit manufacturing processes scale down, this limitation will become more significant to the performance of integrated circuit.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
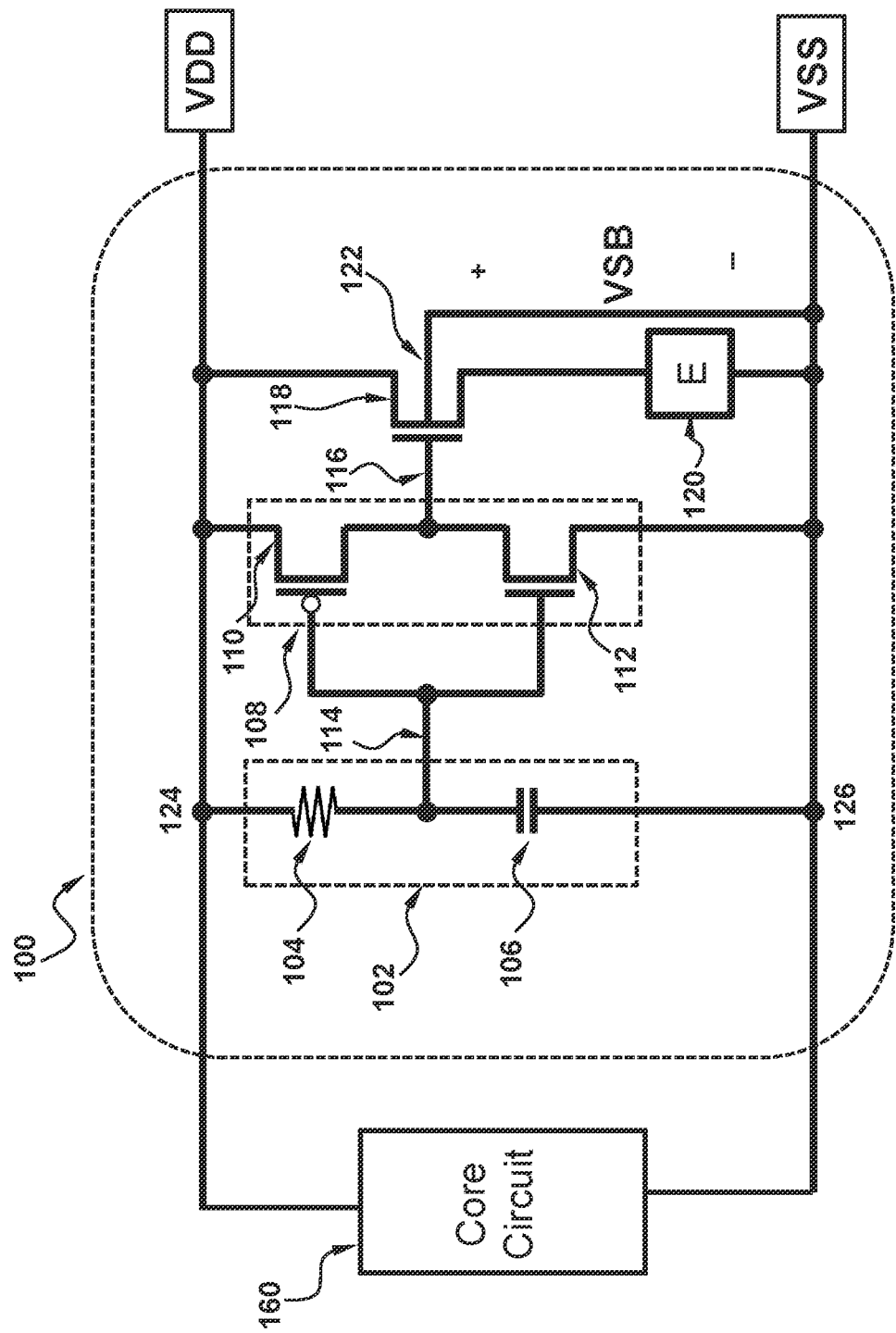
FIG. 1 is a schematic diagram illustrating an integrated circuit including an exemplary ESD power clamp device, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

In this document, the term "coupled" may also be termed as "electrically coupled", and the term "connected" may be termed as "electrically connected." "Coupled" and "connected" may also be used to indicate that two or more elements cooperate or interact with each other.

An ESD power clamp device using bigFET provides excellent ESD protection performance. However, current leakage in bigFET is not negligible. The embodiments described in this disclosure provide techniques for suppressing leakage current in power clamp devices without increasing the size and cost of the devices.

Reference is made to FIG. 1, which is a schematic diagram illustrating an integrated circuit including an exemplary ESD power clamp device 100, in accordance with some embodiments of the present disclosure. The EDS power clamp device 100 can be coupled with a core circuit 160 and provide protection to the core circuit 160 during an ESD event by shunting the ESD current from the supply domain to the ground domain. Since the focus of the present disclosure is the ESD power clamp device 100, the core circuit 160 will be omitted in the subsequent drawings.

Referring to FIG. 1, the ESD power clamp device 100 includes an ESD detection circuit 102. In some embodiments, the ESD detection circuit 102 may include a resistor 104 and a capacitor 106. The resistor 104 and the capacitor 106 can be coupled together to form a resistance-capacitance (RC) time constant circuit. The ESD detection circuit 102 is coupled between the first supply voltage VDD and the second supply voltage VSS. In some embodiments, the VDD can be any voltage suitable for the operations of the core circuit 160. The VSS can be a ground voltage. The RC time constant circuit is not limited to one resistor and one capacitor as shown in the figure. The RC time constant circuit can include any suitable number of capacitors or capacitive devices. The RC time constant circuit can also include any suitable number of resistors or resistive devices.

The ESD power clamp device 100 includes a controlling circuit 108. The controlling circuit 108 includes an input end 114 and an output end 116. In some embodiments, the controlling circuit 108 can be an inverter including a P-channel metal-oxide-semiconductor (PMOS) transistor 110 and an N-channel metal-oxide-semiconductor (NMOS) transistor 112. The source end of the PMOS transistor 110 can be coupled with the supply voltage VDD. The drain end of the PMOS transistor 110 can be coupled with the output end 116 of the inverter 108. The source end of the NMOS transistor can be coupled with the supply voltage VSS. The drain end of the NMOS transistor can be coupled with the output end 116 of the inverter 108. The input end 114 of inverter 108 can be coupled with the ESD detection circuit 102.

The ESD power clamp device 100 includes a field-effect transistor (FET) 118. The drain terminal of the FET 118 can be coupled with the ESD detection circuit 102, the controlling circuit 108, and the supply voltage VDD. The source terminal of the FET 118 can be coupled with the supply voltage VSS via an impedance element, as discussed below. The gate terminal of the FET 118 can be coupled with the output end 116 of the controlling circuit 108. The bulk terminal of the FET 118 can be coupled with the supply voltage VSS, as shown by a reference numeral 122 in FIG. 1.

In some embodiments, FET 118 can be a big field-effect transistor (bigFET). The bigFET can be an NMOS device (e.g., an NMOS transistor) with a large channel width to sink ESD current. The bigFET can also be a PMOS device (e.g., a PMOS transistor) with a large channel width to sink ESD current.

The ESD power clamp 100 includes an impedance element 120. One end of the impedance element 120 is coupled with the source terminal of the FET 118 and the other end of the impedance element 120 is coupled with the supply voltage VSS.

During normal operation without an ESD pulse, the supply voltage VDD can be coupled to the RC time constant circuit 102. Since no substantial current flows to or from the capacitor 106, the voltage state on the input end 114 of the inverter 108 is high. The inverter 108 can in turn output a low voltage to the gate terminal of the FET 118 via the output end 116, turning off the FET 118. Since the FET 118 is turned off, the supply voltage VDD can be desirably supplied to the core circuit 160 for operations.

During an ESD event, the voltage state on the input end 114 of inverter is low. The inverter 108 can in turn output a high voltage to the gate terminal of the FET 118 via the output end 116, turning on the FET 118. If an ESD pulse occurs in the core circuit 160, the turned-on FET 118 can discharge the ESD pulse to the supply voltage VSS (e.g., a ground). The resistor 104 and the capacitor 106 in the ESD detection circuit 102 can provide an RC time constant (e.g., a few microseconds) to keep or maintain the FET 118 on so as to discharge the ESD pulse to the ground. In the present embodiment, because the impedance element 120 is disposed between the source terminal of the FET 118 and the supply voltage VSS, voltage drop occurs across the impedance element 120. On the other hand, the bulk of the FET 118 is coupled to the supply voltage VSS without an impedance element. Therefore, the voltage drop across the impedance element 120 creates a voltage difference (VSB) between the source and the bulk of the FET 118. The difference in voltage between the source and the bulk of the FET 118 will be called "source-bulk voltage" in this disclosure. This source-bulk voltage VSB induces the body effect in the FET 118, thereby suppressing leakage current in the FET 118, as further discussed below in connection with FIG. 2.

Figure 2:
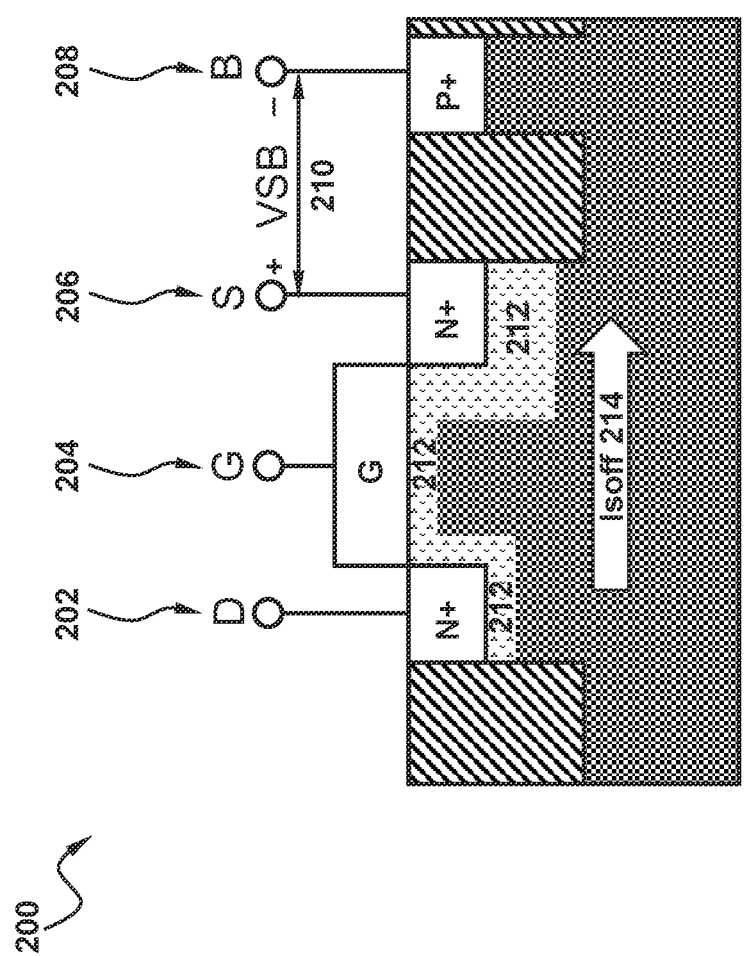
FIG. 2 is a schematic diagram illustrating a cross-sectional view of a FET of an ESD power clamp device at a non-zero source-bulk voltage, in accordance with some embodiments of the present disclosure.

References are made to FIG. 2, which is a schematic diagram illustrating a cross-sectional view of a FET 200 of an ESD power clamp at a non-zero source-bulk voltage, in accordance with some embodiments of the present disclosure. In these exemplary embodiments, the FET 200 is a NMOS transistor. The NMOS transistor 200 in FIG. 2 can be the FET 118 of FIG. 1.

Referring to FIG. 2, the FET 200 includes a drain terminal 202, a gate terminal 204, a source terminal 206, a bulk terminal 208, and a depletion region 212 between the source terminal 206 and the drain terminal 202. The FET 200 can conduct current during an ESD event. The transistor 200 has a non-zero source-bulk voltage VSB 210 between the source terminal 206 and the bulk terminal 208. This source-bulk voltage creates an enlarged depletion region 212, compared with a depletion region of a FET having a zero source-bulk voltage (not shown). This enlarged depletion region in turn increases threshold voltage, and the increased threshold voltage suppresses the source-drain leakage current. FIG. 2 shows a suppressed source-drain leakage current Isoff 214, compared with a source-drain leakage current of a FET having a zero source-bulk voltage. There can be two contributions to static current leakage in a transistor: body leakage current Iboff and source-drain leakage current Isoff. The discussion of the present disclosure focuses on the source-drain leakage current Isoff but the effect of the disclosed embodiments is not limited to suppressing the source-drain leakage current Isoff.

As discussed above in connection with FIG. 1, the non-zero source-bulk voltage VSB 210 of transistor 200 in FIG. 2 is created by the impedance element 120 disposed between the source terminal (e.g., the source terminal 206 in FIG. 2) and the supply voltage VSS (e.g., a ground). By utilizing the impedance element between the source terminal and the ground of the FET of the power clamp device, leakage current in the FET of the power clamp device is effectively suppressed, thereby enhancing ESD protection performance of the power clamp device. Moreover, by utilizing a simple circuit solution, rather than manufacturing or developing new devices, ESD protection can be provided without increasing the size or cost of the power clamp device.

FIG. 2 is merely an example in which an NMOS transistor is utilized as the FET 118 of the power clamp device in FIG. 1. However, the FET 118 is not limited to NMOS transistor. The FET 118 can be a PMOS transistor or any other type of transistors.

Figure 3:
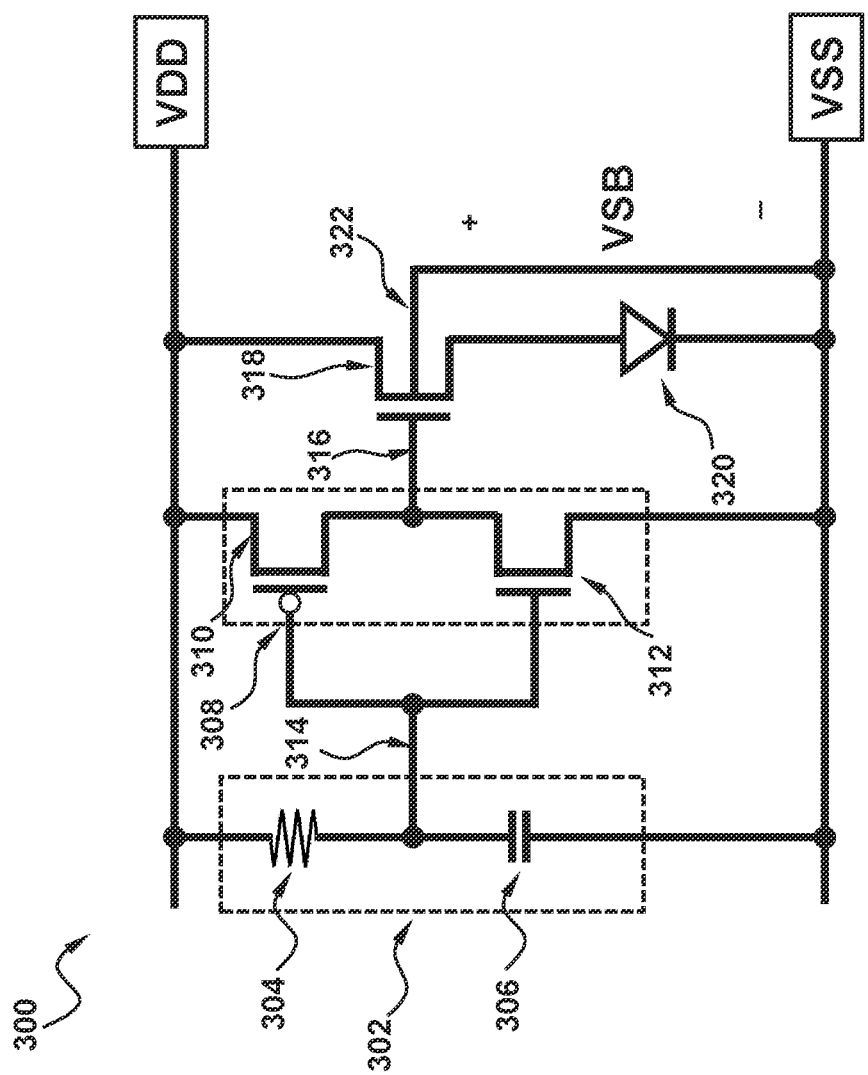
FIG. 3 is a schematic diagram illustrating an exemplary ESD power clamp device including a diode as an impedance element, in accordance with some embodiments of the present disclosure.

Reference is made to FIG. 3, which is a schematic diagram illustrating an exemplary ESD power clamp 300, in accordance with some embodiments of the present disclosure. The ESD power clamp 300 includes an ESD detection circuit 302. In some embodiments, the ESD detection circuit 302 may include a resistor 304 and a capacitor 306 that is coupled with the resistor 304 to form a RC time constant circuit. The ESD detection circuit 302 is coupled between a first supply voltage VDD and a second supply voltage VSS. In some embodiments, the VDD can be any voltage suitable for the operations of a core circuit (not shown). The VSS can be a ground voltage. The ESD detection circuit 302 is similar to the ESD detection circuit 102 of FIG. 1, and the detailed descriptions of the ESD detection circuit 302 are omitted here for the sake of brevity. The ESD power clamp 300 includes a controlling circuit 308 including a PMOS transistor 310 and an NMOS transistor 312 to form an inverter, an input end 314 coupled to the ESD detection circuit 302, and an output end 316. The controlling circuit 308 is similar to the controlling circuit 108 of FIG. 1, and the detailed descriptions of the controlling circuit 308 are omitted here.

Referring to FIG. 3, the ESD power clamp 300 includes a FET 318 and a diode 320. The drain terminal of the FET 318 can be coupled with the ESD detection circuit 302, the controlling circuit 308, and the supply voltage VDD. The gate terminal of the FET 318 can be coupled with the output end 316 of the controlling circuit 308. The source terminal of the FET 318 can be coupled with a terminal of the diode 320. The other terminal of the diode 320 can be coupled with the supply voltage VSS. The bulk terminal of the FET 318 can be coupled with the supply voltage VSS, as shown by a reference numeral 322 in FIG. 3. Compared with FIG. 1, the diode 320 plays the role of the impedance element 120 in FIG. 1, to create a source-bulk voltage VSB for the FET 318 to suppress the leakage current in the FET 318. The diode 320 can be any diode that provides a proper impedance required by the ESD power clamp device 300.

Figure 4:
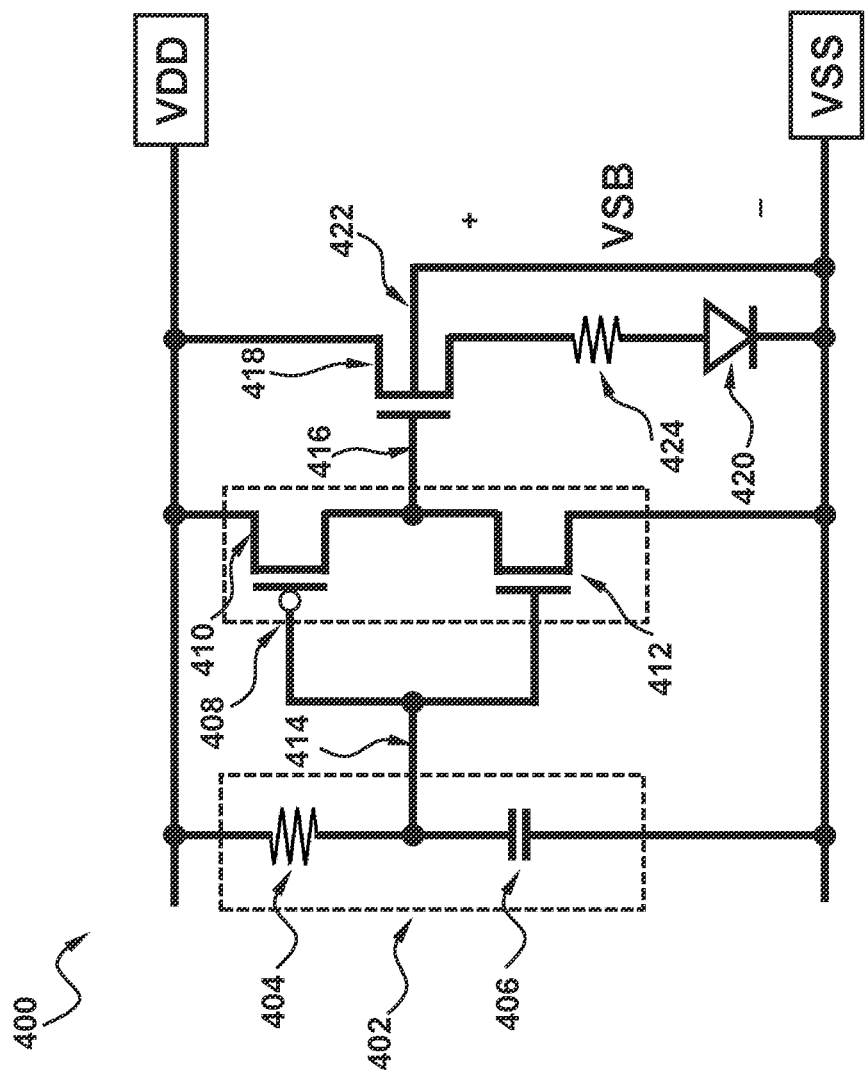
FIG. 4 is a schematic diagram illustrating an exemplary ESD power clamp device including a combination of a resistor and a diode as an impedance element, in accordance with some embodiments of the present disclosure.

Reference is made to FIG. 4, which is a schematic diagram illustrating an exemplary ESD power clamp device 400, in accordance with some embodiments of the present disclosure. The ESD power clamp device 400 includes an ESD detection circuit 402. In some embodiments, the ESD detection circuit 402 may include a resistor 404 and a capacitor 406 that is coupled with the resistor 404 to form a RC time constant circuit. The ESD detection circuit 402 is coupled between a first supply voltage VDD and a second supply voltage VSS. In some embodiments, the VDD can be any voltage suitable for the operations of a core circuit (not shown). The VSS can be a ground voltage. The ESD detection circuit 402 is similar to the ESD detection circuit 102 of FIG. 1, and the detailed descriptions of the ESD detection circuit 402 are omitted here. The ESD power clamp 400 includes a controlling circuit 408 including a PMOS transistor 410 and an NMOS transistor 412 to form an inverter, an input end 414 coupled to the ESD detection circuit 402, and an output end 416. The controlling circuit 408 is similar to the controlling circuit 108 of FIG. 1, and the detailed descriptions of the controlling circuit 408 are omitted here.

Referring to FIG. 4, the ESD power clamp device 400 includes a FET 418, a resistor 424, and a diode 420. The drain terminal of the FET 418 can be coupled with the ESD detection circuit 402, the controlling circuit 408, and the supply voltage VDD. The gate terminal of the FET 418 can be coupled with the output end 416 of the controlling circuit 408. The source terminal of the FET 418 can be coupled with one end of the resistor 424. The other end of the resistor 424 can be coupled with one terminal of the diode 420. The other terminal of the diode 420 can be coupled with the supply voltage VSS. The bulk terminal of the FET 418 can be coupled with the supply voltage VSS, as shown by a reference numeral 422 in FIG. 4. Compared with FIG. 1, the combination of the resistor 424 and the diode 420 plays the role of the impedance element 120 in FIG. 1, to create a source-bulk voltage VSB for the FET 418, thereby suppressing leakage current in the FET 418. The resistor 424 can be any resistor that provides a proper resistance required by the power clamp device 400. The diode 420 can be any diode that provides a proper impedance to the power clamp device 400.

Figure 5:
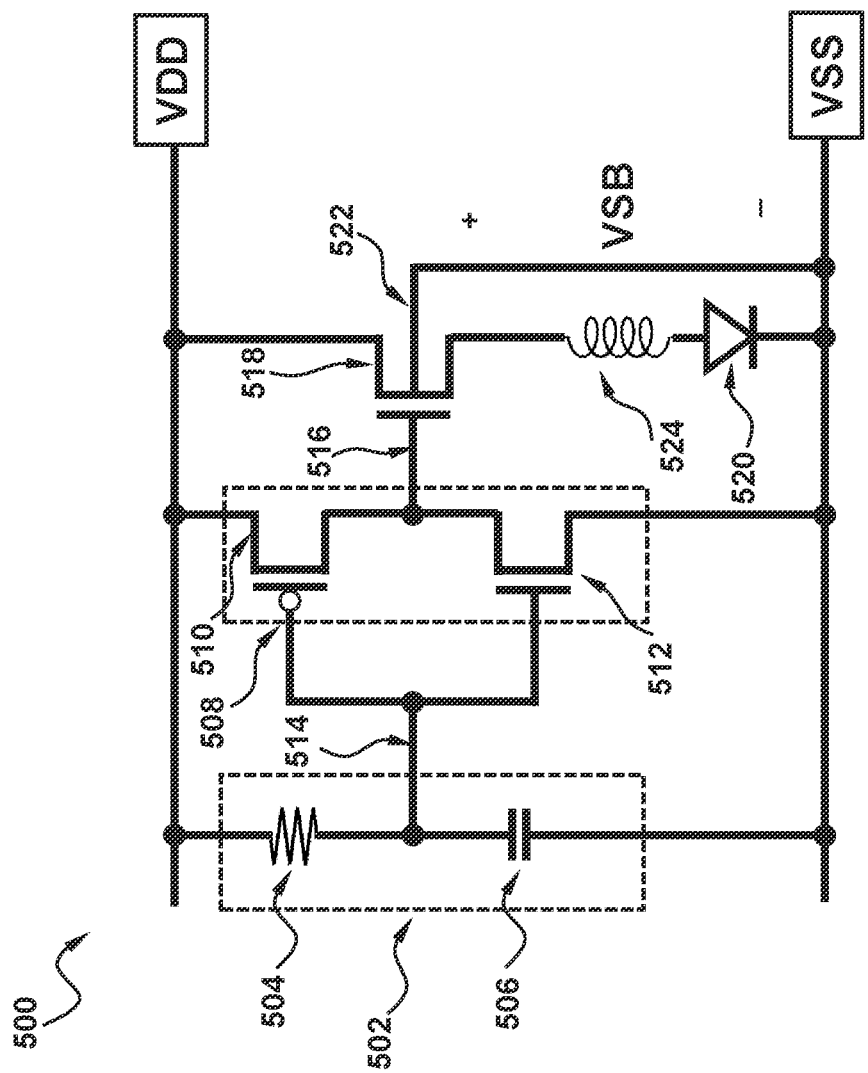
FIG. 5 is a schematic diagram illustrating an exemplary ESD power clamp device including a combination of an inductor and a diode as an impedance element, in accordance with some embodiments of the present disclosure.

Reference is made to FIG. 5, which is a schematic diagram illustrating an exemplary ESD power clamp device 500, in accordance with some embodiments of the present disclosure. The ESD power clamp device 500 includes an ESD detection circuit 502. In some embodiments, the ESD detection circuit 502 may include a resistor 504 and a capacitor 506 that is coupled with the resistor 504 to form a RC time constant circuit. The ESD detection circuit 502 is coupled between a first supply voltage VDD and a second supply voltage VSS. In some embodiments, the VDD can be any voltage suitable for the operations of a core circuit (not shown). The VSS can be a ground voltage. The ESD detection circuit 502 is similar to the ESD detection circuit 102 of FIG. 1, and the detailed descriptions of the ESD detection circuit 502 are omitted here. The ESD power clamp device 500 includes a controlling circuit 508 including a PMOS transistor 510 and an NMOS transistor 512 to form an inverter, an input end 514 coupled to the ESD detection circuit 502, and an output end 516. The controlling circuit 508 is similar to the controlling circuit 108 of FIG. 1, and the detailed descriptions of the controlling circuit 508 are omitted here.

Referring to FIG. 5, the ESD power clamp 500 includes a FET 518, an inductor 524, and a diode 520. The drain terminal of the FET 518 can be coupled with the ESD detection circuit 502, the controlling circuit 508, and the supply voltage VDD. The gate terminal of the FET 518 can be coupled with the output end 516 of the controlling circuit 508. The source terminal of the FET 518 can be coupled with one end of the inductor 524. The other end of the inductor 524 can be coupled with one terminal of the diode 520. The other terminal of the diode 520 can be coupled with the supply voltage VSS. The bulk terminal of the FET 518 can be coupled with the supply voltage VSS, as shown by a reference numeral 522 in FIG. 5. Compared with FIG. 1, the combination of the inductor 524 and the diode 520 plays the role of the impedance element 120 in FIG. 1, to create a source-bulk voltage VSB for the FET 518, thereby suppressing leakage current in the FET 518. The inductor 524 can be any inductor that provides a proper inductance required by the ESD power clamp device 500. The diode 520 can be any diode that provides a proper impedance for the ESD power clamp device 500.

Figure 6:
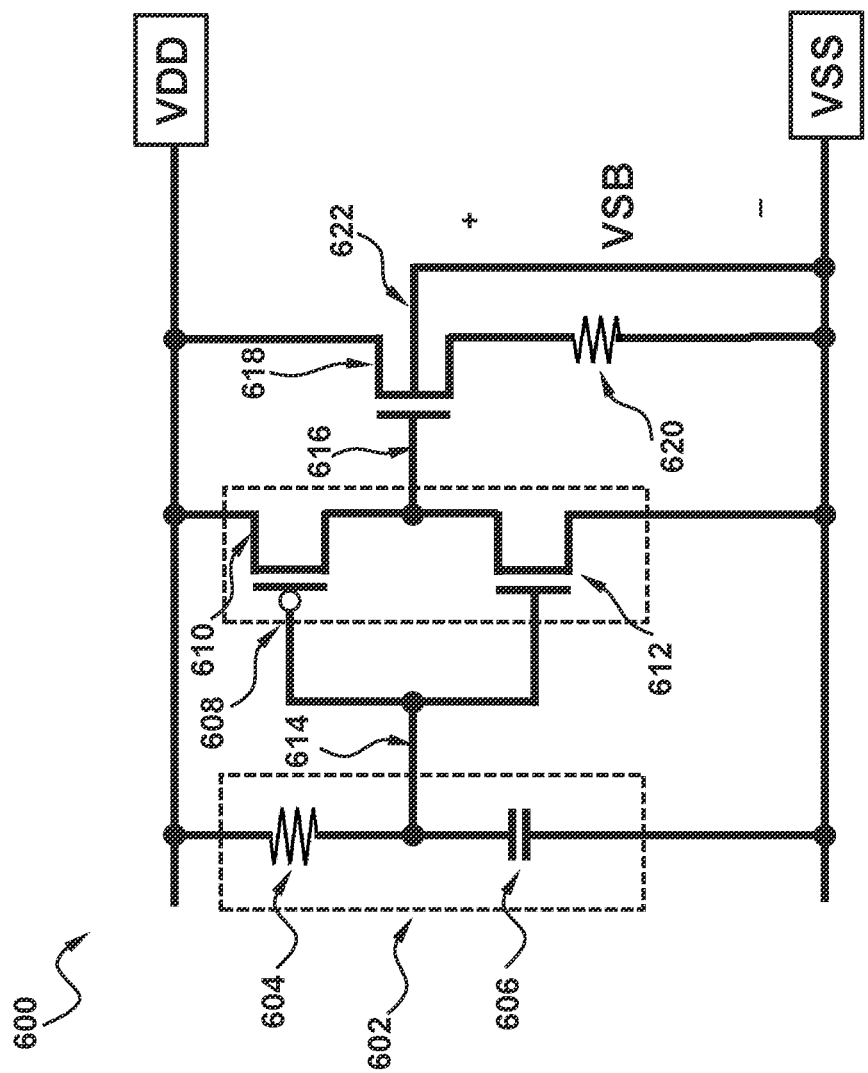
FIG. 6 is a schematic diagram illustrating an exemplary ESD power clamp device including a resistor as an impedance element, in accordance with some embodiments of the present disclosure.

Reference is made to FIG. 6, which is a schematic diagram illustrating an exemplary ESD power clamp device 600, in accordance with some embodiments of the present disclosure. The ESD power clamp device 600 includes an ESD detection circuit 602. In some embodiments, the ESD detection circuit 602 may include a resistor 604 and a capacitor 606 that is coupled with the resistor 604 to form a RC time constant circuit. The ESD detection circuit 602 is coupled between a first supply voltage VDD and a second supply voltage VSS. In some embodiments, the VDD can be any voltage suitable for the operations of a core circuit (not shown). The VSS can be a ground voltage. The ESD detection circuit 602 is similar to the ESD detection circuit 102 of FIG. 1, and the detailed descriptions of the ESD detection circuit 602 are omitted here. The ESD power clamp device 600 includes a controlling circuit 608 including a PMOS transistor 610 and an NMOS transistor 612 to form an inverter, an input end 614 coupled to the ESD detection circuit 602, and an output end 616. The controlling circuit 608 is similar to the controlling circuit 108 of FIG. 1, and the detailed descriptions of the controlling circuit 608 are omitted here.

Referring to FIG. 6, the ESD power clamp device 600 includes a FET 618 and a resistor 620. The drain terminal of the FET 618 can be coupled with the ESD detection circuit 602, the controlling circuit 608, and the supply voltage VDD. The gate terminal of the FET 618 can be coupled with the output end 616 of the controlling circuit 608. The source terminal of the FET 618 can be coupled with one end of the resistor 620. The other end of the resistor 620 can be coupled with the supply voltage VSS. The bulk terminal of the FET 618 can be coupled with the supply voltage VSS, as shown by a reference numeral 622 in FIG. 6. Compared with FIG. 1, the resistor 620 plays the role of the impedance element 120 in FIG. 1, to create a source-bulk voltage VSB for the FET 618, thereby suppressing leakage current in the FET 618. The resistor 620 can be any resistor that provides a proper resistance required by the ESD power clamp device 600.

Figure 7:
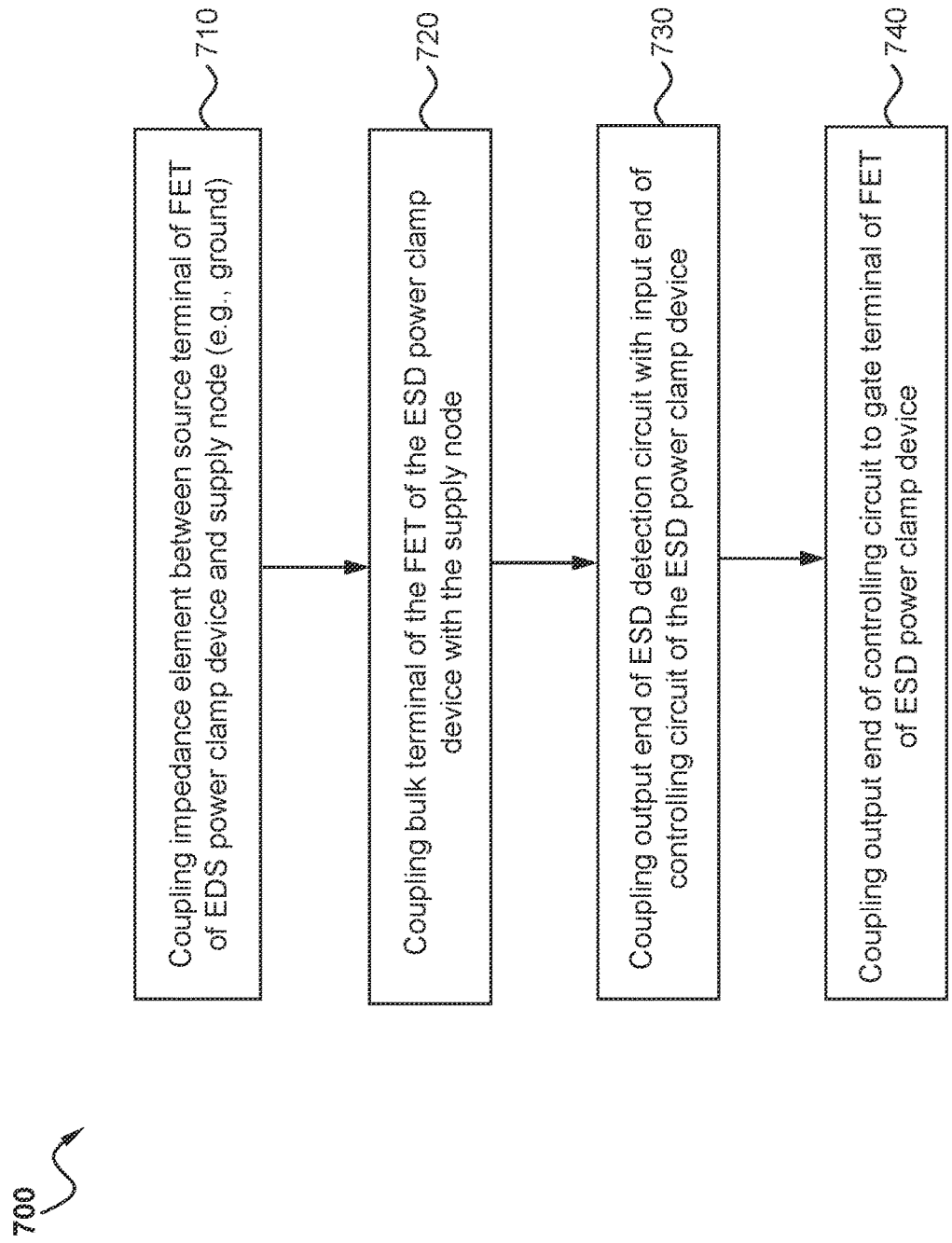
FIG. 7 is a flow chart illustrating a method for operating an ESD power clamp device, in accordance with some embodiments of the present disclosure.

Reference is made to FIG. 7, which is a flow chart illustrating a method 700 for operating an ESD power clamp device, in accordance with some embodiments of the present disclosure. For better understanding of the present disclosure, the method 700 is discussed in relation to embodiments shown in FIG. 1 to FIG. 6, but is not limited thereto. As shown in FIG. 7, in some embodiments, the method 700 includes operations 710-740.

The method 700 includes an operation 710 of coupling an impedance element between a source terminal of a FET of an ESD power clamp device and a supply node. The supply node can be a ground. The method 700 includes an operation 720 of coupling a bulk terminal of the FET of the ESD power clamp device with the supply node. Operations 710 and 720 are performed for generating a source-bulk voltage between a source terminal and a bulk terminal of the FET of the ESD power clamp device. For example, as shown in FIG. 3 to FIG. 6, the impedance element can be at least one of a diode, a resistor, or an inductor. The impedance element can also be a combination of at least one of a diode, a resistor, and an inductor. FIG. 2 shows the advantages of generating the source-bulk voltage. For example, the generated source-bulk voltage causes enlarged depletion region between the source and the drain of the FET of the ESD power clamp device, and the enlarged depletion region in turn increases threshold voltage and thus suppresses leakage current of the ESD power clamp device.

The method 700 includes an operation 730 of coupling an output end of an ESD detection circuit of the ESD power clamp device with an input end of controlling circuit of the ESD power clamp device. For example, as shown in FIG. 1, the ESD detection circuit can include a RC time constant circuit, and the controlling circuit can be an inverter including a PMOS transistor and an NMOS transistor. Operation 730 is performed for providing an RC time constant to keep or maintain the voltage state on the input end of the inverter low or high for a certain time period.

The method 700 includes an operation 740 of coupling an output end of the controlling circuit of the ESD power clamp device to the gate terminal of the FET of the ESD power clamp device to turn-on or turn-off the FET. Operation 740 is performed for turning-on or turning-off the FET of the ESD power clamp device. The low voltage state on the input end of the inverter can output a high voltage to the gate terminal of the FET of the ESD power clamp device, thereby turning on the FET. The turned-on FET can discharge the ESD pulse to supply voltage node (e.g., ground). On the other hand, the high voltage state on the input end of the inverter can output a low voltage to the gate terminal of the FET of the ESD power clamp device, thereby turning off the FET.

Figure 8:
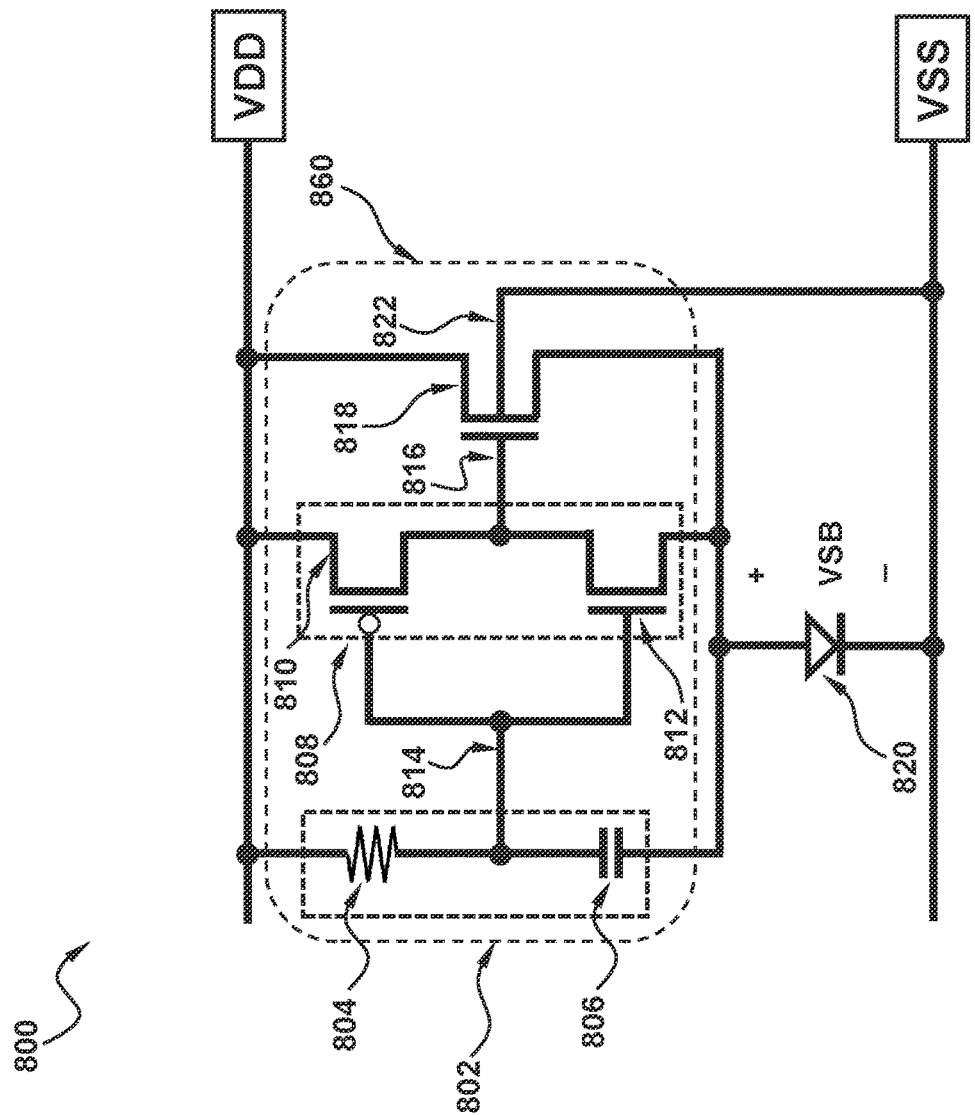
FIG. 8 is a schematic diagram illustrating an exemplary ESD protection circuit including a first circuit including an ESD power clamp device and a second circuit including a diode, in accordance with some embodiments of the present disclosure.

Reference is made to FIG. 8, which is a schematic diagram illustrating an exemplary ESD protection circuit 800, in accordance with some embodiments of the present disclosure. The EDS protection circuit 800 includes a first circuit including an ESD power clamp device 860 and a second circuit including a diode 820.

The ESD power clamp device 860 includes an ESD detection circuit 802. In some embodiments, the ESD detection circuit 802 may include a resistor 804 and a capacitor 806 that is coupled with the resistor 804 to form a RC time constant circuit. In some embodiment, the RC time constant circuit is not limited to one resistor and one capacitor. The RC time constant circuit can include any suitable number of capacitors or capacitive devices. The RC time constant circuit can also include any suitable number of resistors or resistive devices.

The ESD power clamp device 860 includes a controlling circuit 808. The controlling circuit 808 includes an input end 814 and an output end 816. In some embodiments, the controlling circuit 808 can be an inverter including a PMOS transistor 810 and an NMOS transistor 812. The source end of the PMOS transistor 810 can be coupled with the supply voltage VDD. The drain end of the PMOS transistor 810 can be coupled with the output end 816 of the inverter 808. The source end of the NMOS transistor can be coupled with the supply voltage VSS via the diode 820. The drain end of the NMOS transistor can be coupled with the output end 816 of the inverter 808. The input end 814 of inverter 808 can be coupled with the ESD detection circuit 802.

The ESD power clamp device 860 includes a FET 818. The drain terminal of the FET 818 can be coupled with the ESD detection circuit 802, the controlling circuit 808, and the supply voltage VDD. The source terminal of the FET 818 can be coupled with the supply voltage VSS via the diode 820. The gate terminal of the FET 818 can be coupled with the output end 816 of the controlling circuit 808. The bulk terminal of the FET 818 can be coupled with the supply voltage VSS, as shown by a reference numeral 822 in FIG. 8.

In some embodiments, FET 818 can be a bigFET. The bigFET can be an NMOS device (e.g., an NMOS transistor) with a large channel width to sink ESD current. The bigFET can also be a PMOS device (e.g., a PMOS transistor) with a large channel width to sink ESD current.

The diode 820 is coupled with the ESD detection circuit 802, the controlling circuit 808, and the source terminal of the FET 818 of the ESD power clamp device 860. The bulk terminal of the FET 818 is coupled with the supply voltage VSS. The voltage drop occurring across the diode 820 creates a source-bulk voltage between the source and the bulk of the FET 818 of the ESD power clamp device 860. This source-bulk voltage cause an enlarged depletion region between the source and the drain of the FET 818, and thus, increases the threshold voltage and suppresses the leakage current in the FET 818. In addition, the diode 820 also functions as a second ESD power clamp device of the ESD protection circuit 800 by providing voltage drops. The function of diode 820 can be better understood in connection with FIG. 9 below.

Figure 9:
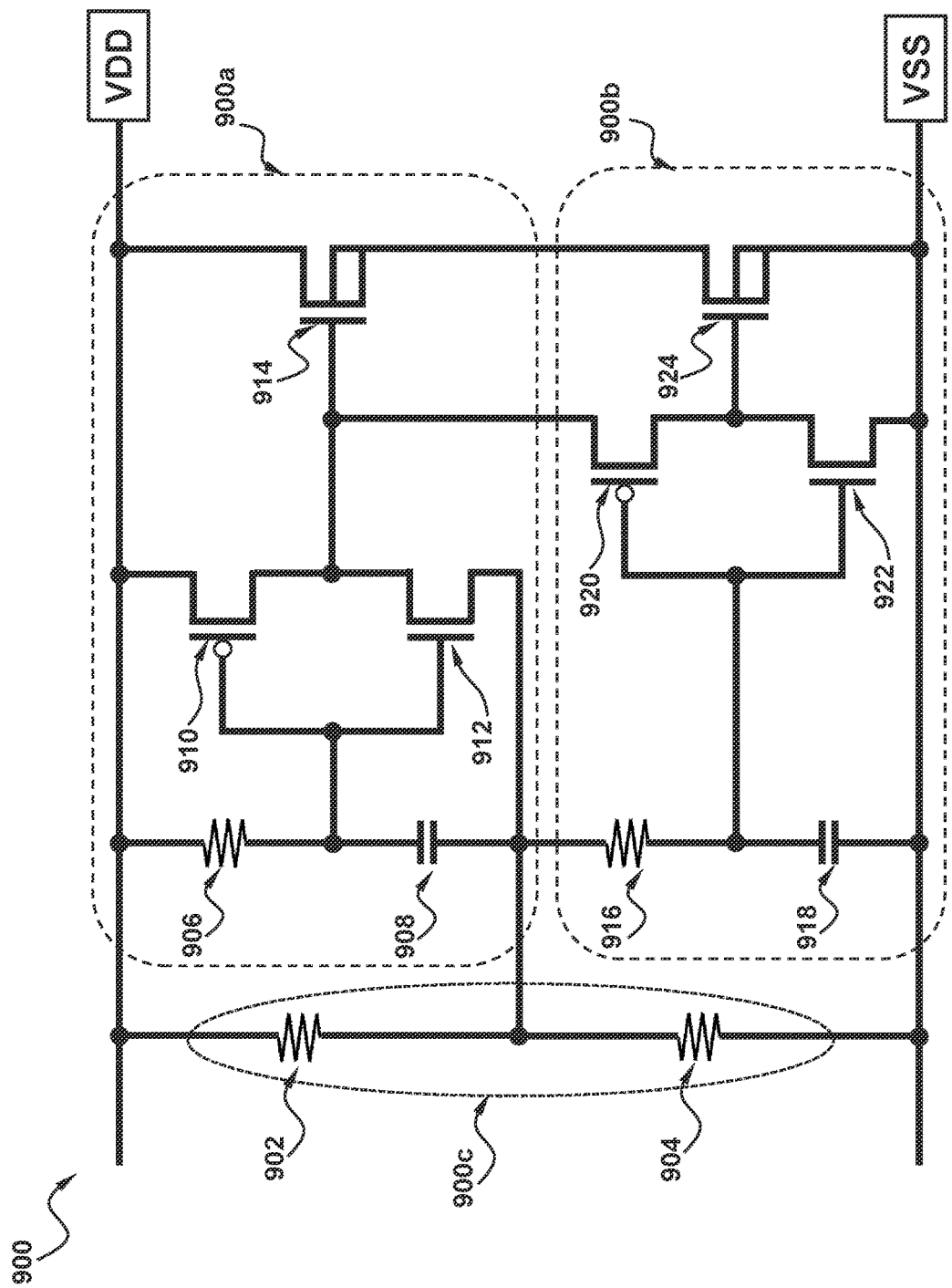
FIG. 9 is a schematic diagram illustrating an ESD protection circuit including a voltage divider, a first circuit including a first power clamp device, and a second circuit including a second power clamp device.

Reference is made to FIG. 9, which is a schematic diagram illustrating an ESD protection circuit 900. The ESD protection circuit 900 includes a first ESD power clamp device 900*a*, a second ESD power clamp device 900*b*, and a voltage divider 900*c*. The first ESD power clamp device 900*a* includes a resistor 906, a capacitor 908 coupled to the resistor 906 to form R-C time constant circuit. The first ESD power clamp device 900*a* includes a PMOS transistor 910 and an NMOS transistor 912 coupled to the PMOS transistor 910 to form an inverter. The first ESD power clamp device 900*a* includes a FET 914 that can be turned-on or turned-off by the output voltage of the inverter.

Similar to the first ESD power clamp device 900*a*, the second ESD power clamp device 900*b* includes a resistor 916 and a capacitor 918 coupled to the resistor 916 to form R-C time constant circuit. The second ESD power clamp device 900*b* includes a PMOS transistor 920 and an NMOS transistor 922 coupled to the PMOS transistor 920 to form an inverter. The second ESD power clamp device 900*b* includes a FET 924 that can be turned-on or turned-off by the output voltage of the inverter. The voltage divider 900*c* includes a resistor 902 and a resistor 904 connected in series.

Compared with the ESD protection circuit 900 of FIG. 9, the ESD protection circuit 800 of FIG. 8 can be formed by replacing the second ESD power clamp device with the diode 820 and removing the voltage divider 900*c*. By removing the voltage divider 900*c*, the unnecessary current dissipation by the resistors 902 and 904 is avoided, thereby preventing extra power consumption of the ESD protection circuit 900. In addition, the ESD power clamp device 860 will be turned on only when electrostatic strikes occur in the circuit. Further, by removing the voltage divider 900*c* and replacing the second ESD power clamp device 900*b* with the diode 820, ESD protection can be provided with a smaller footprint, thereby decreasing the size of the entire circuit. Moreover, as discussed above, the diode 820 creates a voltage difference between the source and the bulk of the FET of the first ESD power clamp device 900*a*, thereby suppressing current leakage in the first ESD power clamp device 900*a*.

The above-described advantages of the ESD protection circuit 800 can be better appreciated by a specific example. In this example, it is assumed the first ESD power clamp device 900*a* can operate with 1.2V voltage. Therefore, if the first ESD power clamp device 900*a* is solely used in an application that requires an operation voltage of 1.8V, the first ESD power clamp device 900*a* may be damaged. However, with combination of the diode 820, as shown in FIG. 8, the diode 820 may provide a 0.7V voltage drop, the ESD protection circuit 800 may operate at an operation voltage as high as 1.9V. That is, the ESD protection circuit 800 can be used safely in the above application which requires 1.8V operation voltage.

The ESD protection circuit 800 of FIG. 8 is merely an exemplary embodiment. In some other embodiments, the diode 820 can be replaced by a plurality of diodes. In some other embodiments, the diode 820 can be replaced by a combination of a diode with a resistor or an inductor.

Figure 10:
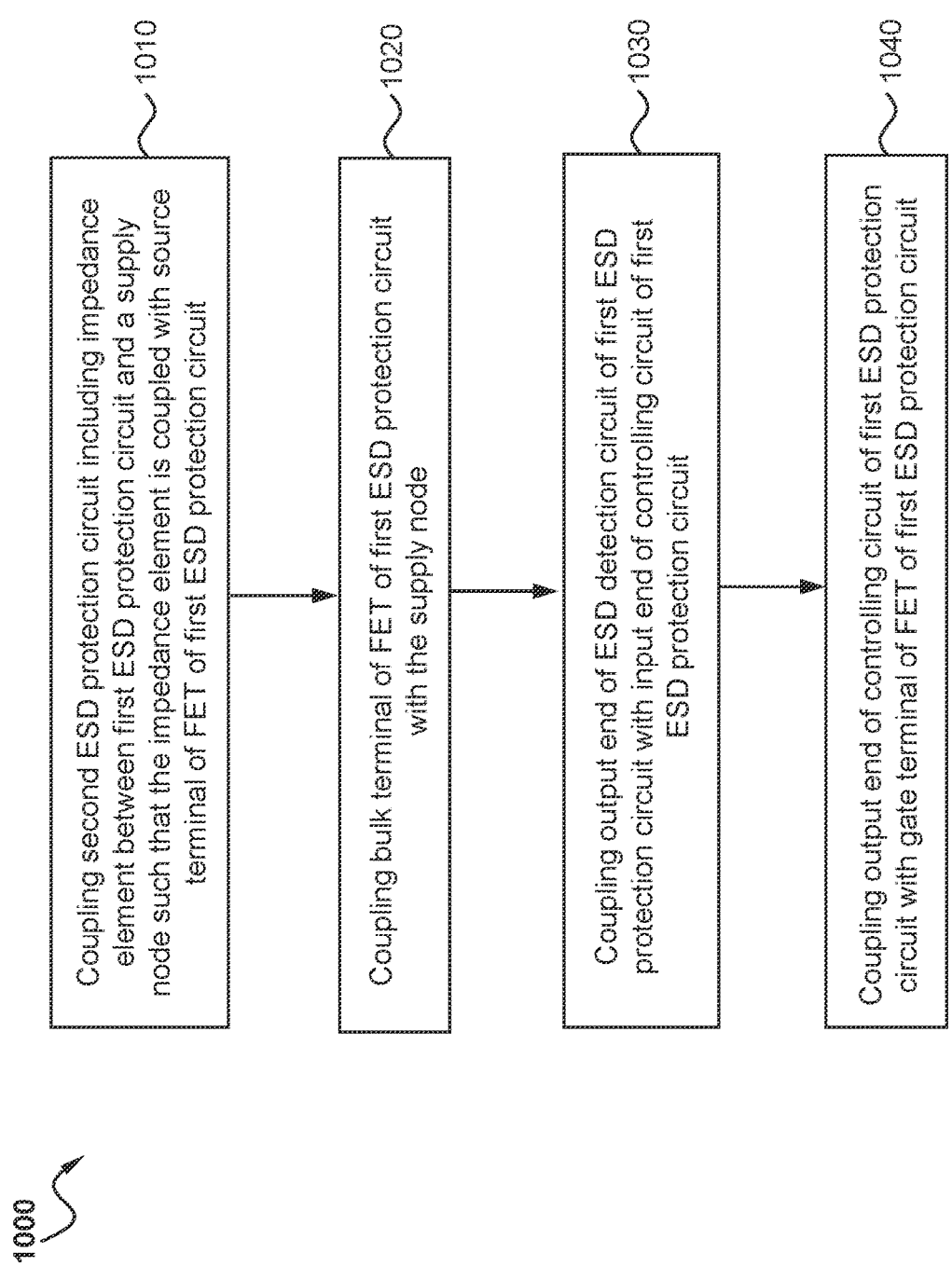
FIG. 10 is a flow chart illustrating a method for operating an ESD protection circuit including a first circuit including an ESD power clamp device and a second circuit including a diode, in accordance with some embodiments of the present disclosure.

Reference is made to FIG. 10, which is a flow chart illustrating a method 1000 for operating an ESD protection device, in accordance with some embodiments of the present disclosure. For better understanding of the present disclosure, the method 1000 is discussed in relation to embodiments shown in FIG. 8, but is not limited thereto. As shown in FIG. 10, in some embodiments, the method 1000 includes operations 1010-1040.

The method 1000 includes an operation 1010 of coupling a second ESD protection circuit including an impedance element between a first ESD protection circuit and a supply node such that the impedance element is coupled with a source terminal of a FET of the first ESD protection circuit. The supply node can be a ground. The method 1000 includes an operation 1020 of coupling a bulk terminal of the FET of the first ESD protection circuit with the supply node. Operations 1010 and 1020 allow for generating a source-bulk voltage for the FET of the first ESD protection circuit. For example, as shown in FIG. 8, the impedance element can be a diode. However, selection of the impedance element is not so limited. In some embodiments, the impedance element can be a plurality of diodes. In some embodiments, the impedance element can be a combination of a diode with a resistor or an inductor. The advantages of operations of 1010 and 1020 can be appreciated in comparison between the ESD protection circuit 800 of FIG. 8 and the ESD protection circuit 900 of FIG. 9, as discussed above.

The method 1000 includes an operation 1030 of coupling an output end of an ESD detection circuit of the first ESD protection circuit with an input end of the controlling circuit of the first ESD protection circuit. For example, as shown in FIG. 8, the ESD detection circuit can include a RC time constant circuit, and the controlling circuit can be an inverter including a PMOS transistor and an NMOS transistor. Operation 1030 is performed for providing an RC time constant to keep or maintain the voltage state on the input end of the inverter low or high for a certain time period.

The method 1000 includes an operation 1040 of coupling an output end of the controlling circuit of the first ESD protection circuit to the gate terminal of the FET of the first ESD protection circuit to turn-on or turn-off the FET. Operation 1040 is performed for turning-on or turning-off the FET of the first ESD protection circuit. The low voltage state on the input end of the inverter can output a high voltage to the gate of the FET, turning on the FET. The turned-on FET can discharge the ESD pulse to supply voltage node (e.g., a ground). On the other hand, the high voltage state on the input end of the inverter can output a low voltage to the gate of the FET, turning off the FET.

Figure 11:
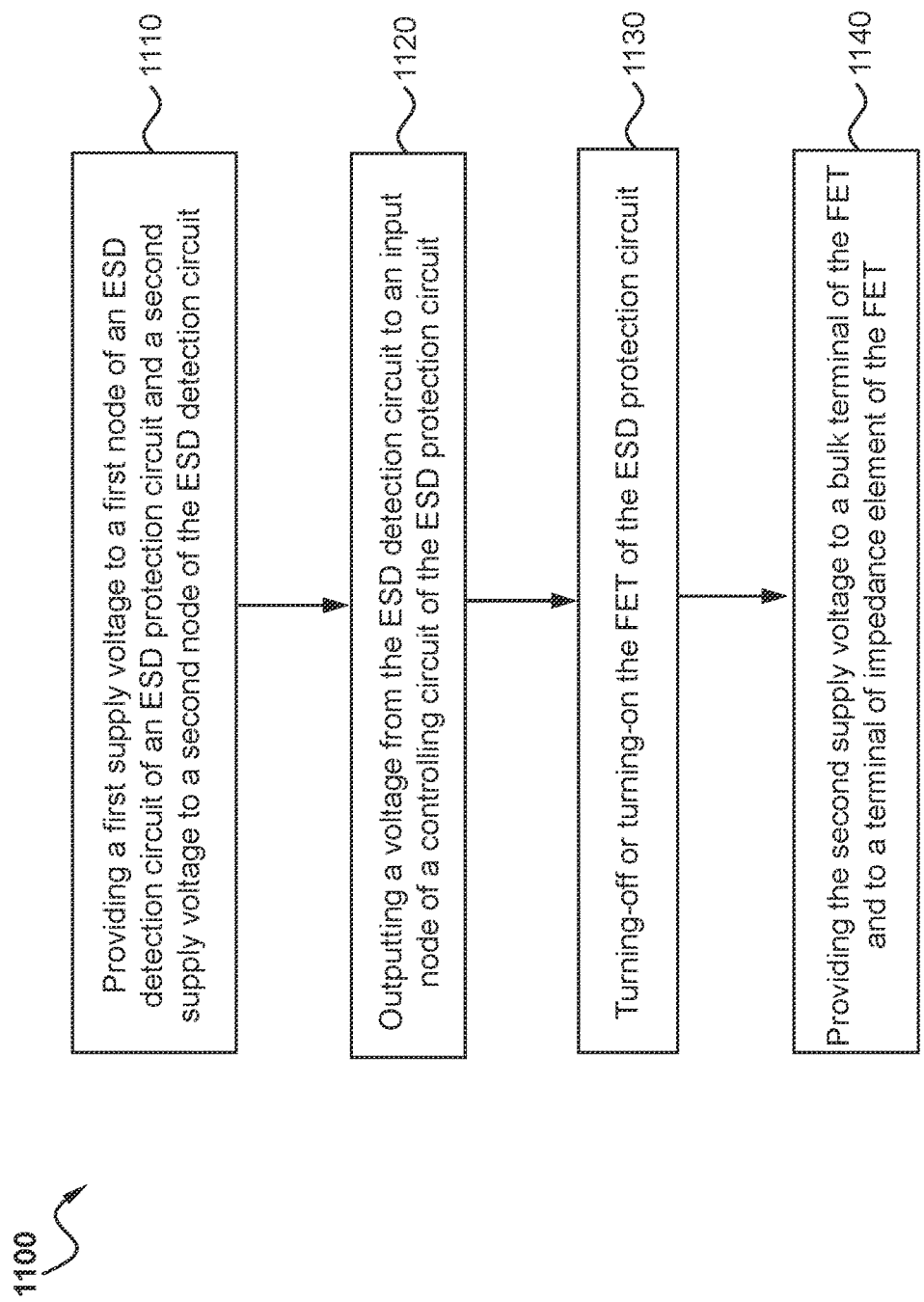
FIG. 11 is a flow chart illustrating a method for operating an ESD protection circuit, in accordance with some embodiments of the present disclosure.

Reference is made to FIG. 11, which is a flow chart illustrating a method 1100 for operating an ESD protection circuit, in accordance with some embodiments of the present disclosure. For better understanding of the present disclosure, the method 1100 is discussed in relation to embodiments shown in FIGS. 1-10, but is not limited thereto. As shown in FIG. 11, in some embodiments, the method 1100 includes operations 1110-1140.

The method 1100 includes an operation 1110 of providing a first supply voltage to a first node of an ESD detection circuit of an ESD protection circuit and a second supply voltage to a second node of the ESD detection circuit of the ESD protection circuit. For example, as shown in FIG. 1, the first supply voltage VDD is provided to a node 124 of the ESD detection circuit 102 of the ESD power clamp device 100, and the second supply voltage VSS is provided to a node 126 of the ESD detection circuit 102 of the ESD power clamp device 100. In some embodiments, the VDD can be any voltage suitable for the operations of a core circuit, such as the core circuit 160 of FIG. 1. The VSS can be a ground voltage. In some embodiments, the ESD detection circuit can be an RC time constant circuit including a resistor and a capacitor, such as the ESD detection circuit 102 of FIG. 1. However, the RC time constant circuit is not limited to one resistor and one capacitor as shown in the figure. The RC time constant circuit can include any suitable number of capacitors or capacitive devices. The RC time constant circuit can also include any suitable number of resistors or resistive devices.

The method 1100 includes an operation 1120 of outputting a voltage from the ESD detection circuit to an input node of a controlling circuit of the ESD protection circuit. For example, as shown in FIG. 1, during normal operation without an ESD pulse, since no substantial current flows to or from the capacitor 106 of the ESD detection circuit 102, a high voltage is outputted from the ESD detection circuit 102 to the input end 114 of the controlling circuit 108 of the ESD power clamp device 100. On the other hand, during an ESD event, a low voltage is outputted from the ESD detection circuit 102 to the input end 114 of the controlling circuit 108 of the ESD power clamp device 100. The controlling circuit of the ESD protection circuit can be an inverter circuit, such as the inverter 108 of FIG. 1.

The method 1100 includes an operation 1130 of turning-off or turning-on the FET of the ESD protection circuit. For example, as shown in FIG. 1, during normal operation without an ESD pulse, the voltage state on the input end 114 of the inverter 108 is high, and a low voltage is outputted from the inverter 108 to the gate terminal of the FET 118 via the output end 116, turning off the FET 118. Since the FET 118 is turned off, the supply voltage VDD can be desirably supplied to the core circuit 160 for operations. On the other hand, during an ESD event, the voltage state on the input end 114 of inverter is low, and a high voltage is outputted from the inverter 108 to the gate terminal of the FET 118 via the output end 116, turning on the FET 118. If an ESD pulse occurs in the core circuit 160, the turned-on FET 118 can discharge the ESD pulse to the supply voltage VSS (e.g., a ground).

The method 1100 includes an operation 1140 of providing the second supply voltage to a bulk terminal of the FET and to a terminal of impedance element of the FET. For example, as shown in FIG. 1, the supply voltage VSS is provided to the bulk terminal of the FET 118 (indicated as 122). The supply voltage VSS is also provided to a terminal of the impedance element 120. Because the impedance element 120 is disposed between the source terminal of the FET 118 and the supply voltage VSS, a voltage drop occurs across the impedance element 120. On the other hand, the bulk of the FET 118 is coupled to the supply voltage VSS without an impedance element. The voltage drop across the impedance element 120 creates a non-zero source-bulk voltage. This source-bulk voltage VSB induces the body effect in the FET 118, thereby suppressing leakage current in the FET 118.

The above illustrations include exemplary operations, but the operations are not necessarily performed in the order shown. Operations may be added, replaced, changed order, and/or eliminated as appropriate, without departing from the spirit and scope of the present disclosure.

In some embodiments, an ESD power clamp device is disclosed. The ESD power clamp device includes an ESD detection circuit; a controlling circuit coupled with the ESD detection circuit; a field effect transistor (FET) coupled with the controlling circuit; and an impedance element coupled with the FET. The FET includes a drain terminal coupled with a first supply node; a gate terminal coupled with an output end of the controlling circuit; a source terminal coupled with a second supply node via the impedance element; and a bulk terminal coupled with the second supply node.

In some embodiments, an ESD protection circuit disclosed. The ESD protection circuit includes a first protection circuit comprising an ESD power clamp device; and a second protection circuit comprising an impedance element that is coupled with the ESD power clamp device of the first protection circuit. The ESD power clamp device of the first protection circuit includes an ESD detection circuit; a controlling circuit coupled with the ESD detection circuit; and a FET coupled between a first supply node and a second supply node. The FET includes a drain terminal coupled to the first supply node; a gate terminal coupled with an output end of the controlling circuit; a source terminal coupled with the second supply node via the impedance element of the second protection circuit; and a bulk terminal coupled with the second supply node.

In some embodiments, a method for operating an ESD protection circuit is also disclosed. The ESD protection circuit includes a FET coupled between a first supply node and a second supply node. The method includes generating a source-bulk voltage between a source terminal and a bulk terminal of the FET; and providing a voltage state to a gate terminal of the FET for turning-on or turning-off the FET.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An electrostatic discharge (ESD) power clamp device, comprising:
   an ESD detection circuit;
   a controlling circuit coupled with the ESD detection circuit;
   a field effect transistor (FET) coupled with the controlling circuit; and
   an impedance element coupled with the FET, the impedance element comprising a diode and at least one of a resistor or an inductor, the resistor or the inductor being connected with the diode in series,
   wherein the FET comprises:
      a drain terminal coupled with a first supply node;
      a gate terminal coupled with an output end of the controlling circuit;
      a source terminal coupled with a second supply node via the impedance element; and
      a bulk terminal coupled with the second supply node.

2. The ESD power clamp device of claim 1, wherein the second supply node is a ground.

3. The ESD power clamp device of claim 1, wherein the ESD detection circuit comprises a resistor and a capacitive device that form a resistance-capacitance (R-C) circuit.

4. The ESD power clamp device of claim 1, wherein the controlling circuit comprises a PMOS transistor and an NMOS transistor that form an inverter.

5. The ESD power clamp device of claim 4, wherein a source end of the PMOS transistor is coupled with the first supply node, the drain end of the PMOS transistor is coupled with an output end of the inverter, the source end of the NMOS transistor is coupled with the second supply node, and the drain end of the NMOS transistor is coupled with the output end of the inverter.

6. The ESD power clamp device of claim 1, wherein the first supply node is provided with a voltage suitable for operations of a core circuit coupled with the EDS power clamp device.

7. The ESD power clamp device of claim 1, wherein the ESD detection circuit is coupled between the first supply node and the second supply node.

8. The ESD power clamp device of claim 1, wherein the FET is a big field-effect transistor (bigFET).

9. An electrostatic discharge (ESD) protection circuit, comprising:
- a first protection circuit comprising an ESD power clamp device; and
- a second protection circuit comprising an impedance element that is coupled with the ESD power clamp device of the first protection circuit, the impedance element comprising a combination of a diode, a resistor, and an inductor;
- wherein the ESD power clamp device of the first protection circuit comprises:
  - an ESD detection circuit;
  - a controlling circuit coupled with the ESD detection circuit; and
  - a field effect transistor (FET) coupled between a first supply node and a second supply node, wherein the FET comprises:
  - a drain terminal coupled with the first supply node;
  - a gate terminal coupled with an output end of the controlling circuit;
  - a source terminal coupled with the second supply node via the impedance element of the second protection circuit; and
  - a bulk terminal coupled with the second supply node.

10. The ESD protection circuit of claim 9, wherein the second supply node is a ground.

11. The ESD protection circuit of claim 9, wherein the ESD detection circuit comprises a resistor and a capacitive device that form a resistance-capacitance (R-C) circuit.

12. The ESD protection circuit of claim 9, wherein the controlling circuit comprises a PMOS transistor and an NMOS transistor that form an inverter.

13. The ESD protection circuit of claim 12, wherein a source end of the PMOS transistor is coupled with the first supply node, the drain end of the PMOS transistor is coupled with an output end of the inverter, the source end of the NMOS transistor is coupled with the second supply node, and the drain end of the NMOS transistor is coupled with the output end of the inverter.

14. The ESD protection circuit of claim 9, wherein the impedance element is further coupled with the ESD detection circuit and the controlling circuit.

15. A method for operating an ESD protection circuit, the ESD protection circuit including an ESD detection circuit, a controlling circuit, a field effect transistor (FET), the method comprising:
- providing a first supply voltage to a first node of the ESD detection circuit of the ESD protection circuit and a second supply voltage to a second node of the ESD detection circuit;
- outputting a voltage from the ESD detection circuit to an input node of the controlling circuit of the ESD protection circuit;
- turning-off or turning-on the FET of the ESD protection circuit; and
- providing the second supply voltage to a bulk terminal of the FET and to a terminal of an impedance element coupled to the FET, the impedance element comprising a diode and at least one of a resistor or an inductor, the resistor or the inductor being connected with the diode in series.

16. The method of claim 15, wherein a drain terminal of the FET is coupled to the first supply voltage and a source terminal of the FET is coupled to the second supply voltage via the impedance element.

17. The method of claim 15, wherein the second supply voltage is a ground voltage.

18. The method of claim 15, wherein the ESD detection circuit comprises a resistor and a capacitor that form a resistance-capacitance (R-C) circuit, and the first supply voltage is provided to the resistor end of the ESD detection circuit and the second supply voltage is provided to the capacitor end of the ESD detection circuit.

19. The method of claim 15, wherein the controlling circuit comprises a PMOS transistor and an NMOS transistor that form an inverter, and the method further comprises:
- providing the first supply voltage to a source terminal of the PMOS transistor; and
- providing the second supply voltage to a source terminal of the NMOS transistor.

20. The method of claim 15, wherein turning-off and turning-on the FET of the ESD protection circuit is controlled by output voltages outputted from the controlling circuit of the ESD protection circuit.

* * * * *